United States Patent
Shibao

(10) Patent No.: US 11,516,368 B2
(45) Date of Patent: Nov. 29, 2022

(54) INFORMATION PROCESSING DEVICE, IMAGE FORMING APPARATUS, CONTROL METHOD THEREOF, AND STORAGE MEDIUM FOR SENDING JOB INFORMATION

(71) Applicant: CANON KABUSHIKI KAISHA, Tokyo (JP)

(72) Inventor: Mayumi Shibao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/148,389

(22) Filed: Jan. 13, 2021

(65) Prior Publication Data
US 2021/0243330 A1    Aug. 5, 2021

(30) Foreign Application Priority Data

Jan. 30, 2020 (JP) .............................. JP2020-014214

(51) Int. Cl.
*H04N 1/32* (2006.01)
*H04N 1/00* (2006.01)
*H04N 1/333* (2006.01)

(52) U.S. Cl.
CPC ..... *H04N 1/32096* (2013.01); *H04N 1/00228* (2013.01); *H04N 1/33369* (2013.01)

(58) Field of Classification Search
CPC ............. H04N 1/0022; H04N 1/00482; H04N 1/32037; H04N 1/32096; H04N 1/00228; H04N 1/33369; H04N 1/4433; H04N 2201/0094

USPC .......................................................... 382/289
See application file for complete search history.

(56) References Cited

U.S. PATENT DOCUMENTS

| | | | |
|---|---|---|---|
| 5,999,707 A * | 12/1999 | Taniguchi | G06F 3/1204 358/1.15 |
| 2007/0214508 A1* | 9/2007 | Fukui | H04N 1/00501 726/28 |
| 2012/0079064 A1* | 3/2012 | Fukushima | H04N 1/32416 709/217 |
| 2012/0322461 A1* | 12/2012 | Ito | G06F 3/04883 455/456.1 |
| 2013/0235413 A1* | 9/2013 | Terao | G06F 21/608 358/1.14 |
| 2014/0029035 A1* | 1/2014 | Maruyama | G06F 3/1205 358/1.13 |
| 2018/0103160 A1* | 4/2018 | Sugita | H04N 1/4433 |

FOREIGN PATENT DOCUMENTS

JP         2019-068336 A         4/2019

* cited by examiner

*Primary Examiner* — Gabriel I Garcia
(74) *Attorney, Agent, or Firm* — Canon U.S.A., Inc. IP Division

(57) ABSTRACT

In a case where a user instructs an image forming apparatus to perform processing of sending scanned image data to the user from a mobile terminal, the user needs to input a user's e-mail address on the mobile terminal, which includes an inconvenient operation. From the mobile terminal, the user instructs the image forming apparatus to send the data to the user's e-mail address which is preliminarily registered in the image forming apparatus.

17 Claims, 14 Drawing Sheets

INFORMATION PROCESSING DEVICE, IMAGE FORMING APPARATUS, CONTROL METHOD THEREOF, AND STORAGE MEDIUM FOR SENDING JOB INFORMATION

BACKGROUND

Field of the Disclosure

The present disclosure relates to a data processing device including a sending unit, an information processing method of the data processing device, and a storage medium.

Description of the Related Art

In recent years, a high-performance mobile terminal called a smartphone has become widespread. The mobile terminal can send instructions for scanning, printing, and the like to an image forming apparatus, and operate the image forming apparatus. For example, an operation to send image data scanned by the image forming apparatus to a set destination can be instructed from the mobile terminal. The mobile terminal configures a job by adding an e-mail address as a sending destination of image data set on the mobile terminal by a user and various kinds of scan setting information to the job. The mobile terminal then sends the job to the image forming apparatus. The image forming apparatus, which has received the job, sends image data scanned in accordance with a scan setting included in the job to the e-mail address as the sending destination included in the job. In this manner, a series of setting operations necessary for sending the scanned image data can be completed using the mobile terminal. In this operation, communication between the mobile terminal and the image forming apparatus is established in accordance with a communication protocol, such as Transmission Control Protocol/Internet Protocol (TCP/IP), Near Field Communication (NFC), and Bluetooth®. In recent years, after the user performs settings on the mobile terminal, the user can also operate the image forming apparatus in accordance with the settings via the NFC or the like by simply bringing the mobile terminal close to (in touch with) the image forming apparatus.

Meanwhile, after a scan setting and a sending destination setting are performed on an operation panel of the image forming apparatus, the image forming apparatus can also send scanned image data. As a method of easily selecting an e-mail address of a user who is performing an operation at the time of setting a sending destination on the operation panel of the image forming apparatus, Japanese Patent Application Laid-Open No. 2019-68336 proposes the following method. That is, a user who can log in to the image forming apparatus and the user's e-mail address are preliminarily registered in association with each other in the image forming apparatus. When the user logs in to the image forming apparatus, the image forming apparatus displays a send-to-myself button to set the log-in user's e-mail address as a destination to which scanned image data or the like is sent. Japanese Patent Application Laid-Open No. 2019-68336 also discusses a method in which the image forming apparatus calls the user's e-mail address registered in association with the user when the user selects the send-to-myself button and sets the e-mail address as the destination.

In a case where the user instructs the image forming apparatus to perform processing of sending scanned image to the user from the mobile terminal, the user needs to input the user's e-mail address using the mobile terminal, which requires the user to perform an inconvenient operation.

SUMMARY

Embodiments of the present disclosure are directed to increasing user operability in a case where the user instructs the image forming apparatus to send data to the user from the mobile terminal. According to embodiments of the present disclosure, a method for an information processing device capable of communicating with an image forming apparatus, the method includes sending first information including user information of a user operating the information processing device and information to instruct the image forming apparatus to send image data to a destination of the user which is preliminarily registered in the image forming apparatus in correspondence with the user information, to the image forming apparatus.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings. Note that constituent elements described in the exemplary embodiments are merely examples, and are not intended to limit the scope of the present disclosure.

Figure 1:
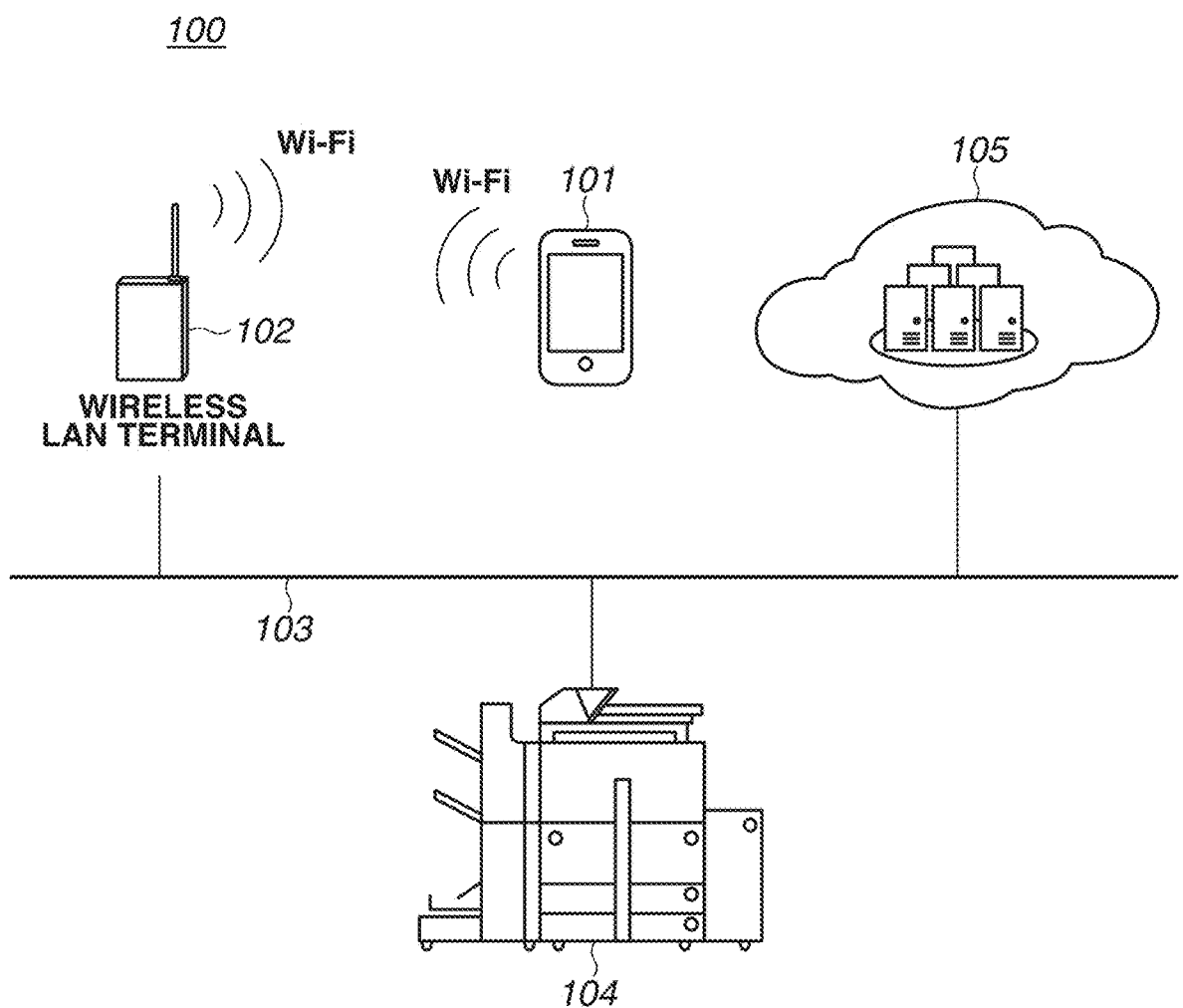
FIG. 1 is a diagram illustrating a system configuration according to an exemplary embodiment.

FIG. 1 is a block diagram illustrating a configuration of a data processing system according to a first exemplary embodiment. A data processing system 100 includes a data processing device 101, a wireless local area network (LAN) terminal 102, an image forming apparatus 104, and a cloud server 105, which are connected with one another via a network 103, such as a LAN.

The data processing device 101 is, for example, a mobile terminal, such as a smartphone, and may be an information processing device in which an operating system for a compact terminal and a program for controlling an audio phone call, positional detection, and data communication operate. Alternatively, the data processing device 101 may be a personal computer not having functions, such as audio phone call control and positional detection control. The data processing device 101 is connected with the network 103 by the wireless LAN terminal 102.

The wireless LAN terminal 102 is a wireless LAN master unit having a typical network router function, and provides a wireless LAN in, for example, a home and an office.

The image forming apparatus 104 is a multi-function peripheral having various kinds of functions, such as a printer function, a copy function, a scan function, and a fax function. The image forming apparatus 104 may be configured to incorporate a wireless access point, and be capable of directly communicating with the data processing device 101. From the data processing device 101 in communication with the image forming apparatus 104, a user can instruct the image forming apparatus 104 to execute a job to cause the image forming apparatus 104 to execute a function of the image forming apparatus 104.

The cloud server 105 exchanges data with the data processing device 101 or the image forming apparatus 104 via the network 103. The cloud server 105, for example, manages data that is used in the data processing device 101 and the image forming apparatus 104 and performs processing of, for example, extending various kinds of functions. While, in the present exemplary embodiment, the image forming apparatus 104 and the cloud server 105 have wired connection with the network 103, a wireless connection may be used using the wireless LAN terminal 102 similarly to the data processing device 101.

The data processing device 101 and the image forming apparatus 104 are also capable of performing short-range wireless communication using Near Field Communication (NFC), Bluetooth® Low Energy (Bluetooth® LE), or the like. The image forming apparatus 104 sends connection information (such as an Internet Protocol (IP) address, a media access control (MAC) address, and subsystem identification (SSID)) to allow the data processing device 101 to have wireless LAN connection with the image forming apparatus 104 via an NFC communication unit or a Bluetooth® LE communication unit, which will be described below. The data processing device 101 then starts wireless LAN communication with the image forming apparatus 104 using the acquired connection information.

Figure 2:
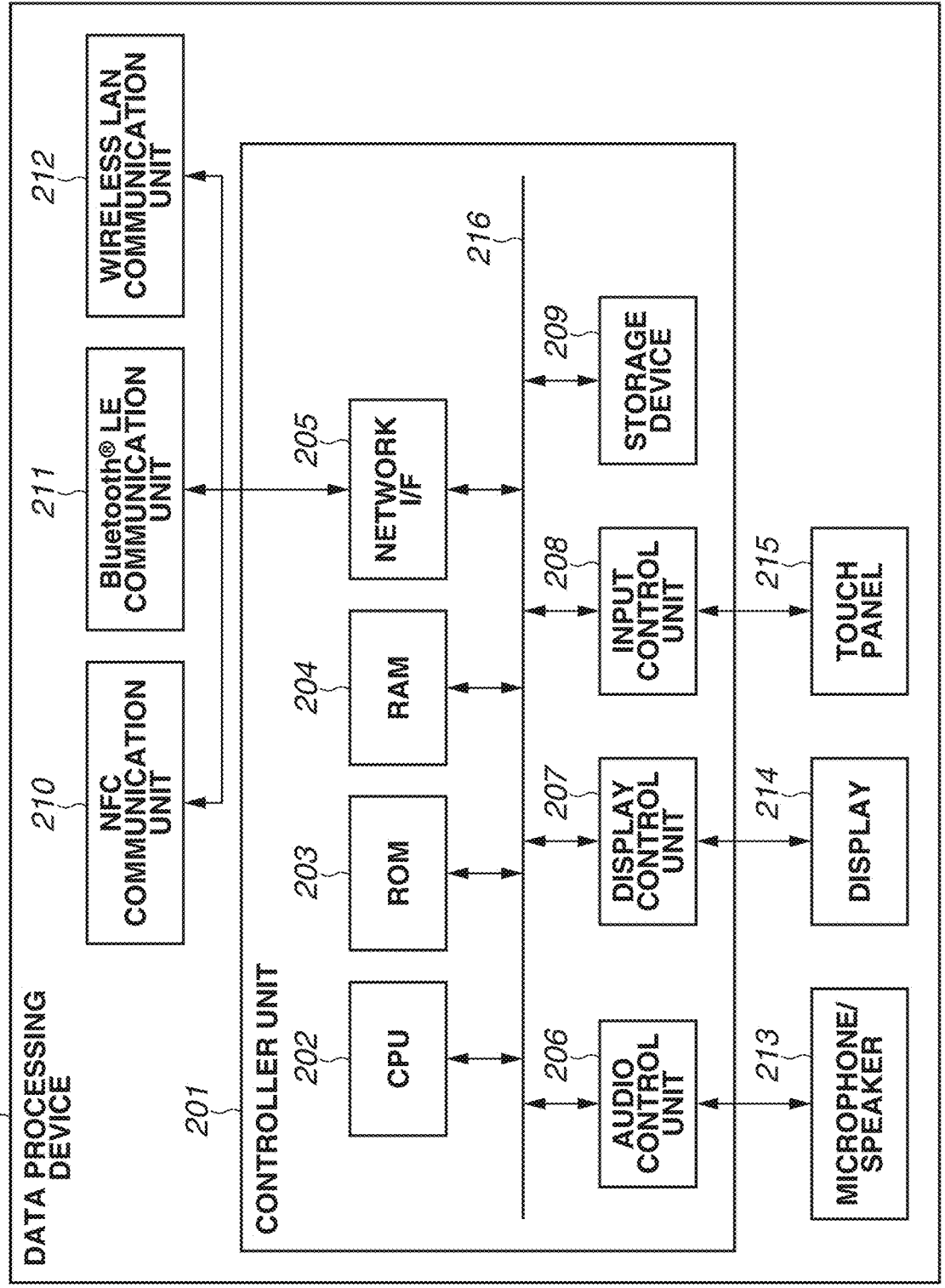
FIG. 2 is a diagram illustrating a hardware configuration of a data processing device according to the present exemplary embodiment.

FIG. 2 is a diagram illustrating a hardware configuration of the data processing device 101 according to the present exemplary embodiment. The data processing device 101 includes a controller unit 201. The controller unit 201 controls various kinds of communication units, i.e., an NFC communication unit 210, a Bluetooth® LE communication unit 211, and a wireless LAN communication unit 212, and various kinds of user interface (UI) units, i.e., a microphone/speaker 213, a display 214, and a touch panel 215.

The controller unit 201 includes a central processing unit (CPU) 202, a read-only memory (ROM) 203, a random-access memory (RAM) 204, a network interface (I/F) 205, an audio control unit 206, a display control unit 207, an input control unit 208, and a storage device 209, which are connected with one another by a system bus 216.

The CPU 202 controls the whole system of the data processing device 101. An operating system of the data processing device 101 and a program for controlling a phone call, data communication, and the like are stored in the ROM 203, and the CPU 202 executes various kinds of programs. The RAM 204 is used as a main memory of the CPU 202 and a temporary storage area of a work area or the like.

The storage device 209 is a nonvolatile storage device, and records settings for various kinds of operation modes, operating logs, and the like that are held in the storage device 209 even after a restart of the data processing device 101.

The network I/F 205 is connected with the NFC communication unit 210, the Bluetooth® LE communication unit 211, and the wireless LAN communication unit 212, and exchanges data with the image forming apparatus 104 or the cloud server 105 via various kinds of wireless communication.

The audio control unit 206 performs input/output control of audio data via the microphone/speaker 213. The display control unit 207 performs output control of a screen displayed on the display 214. The input control unit 208 performs input control of information instructed by the user via a button or the touch panel 215. Various kinds of applications executed in the data processing device 101 use the audio control unit 206, the display control unit 207, the input control unit 208, and the like.

Figure 3:
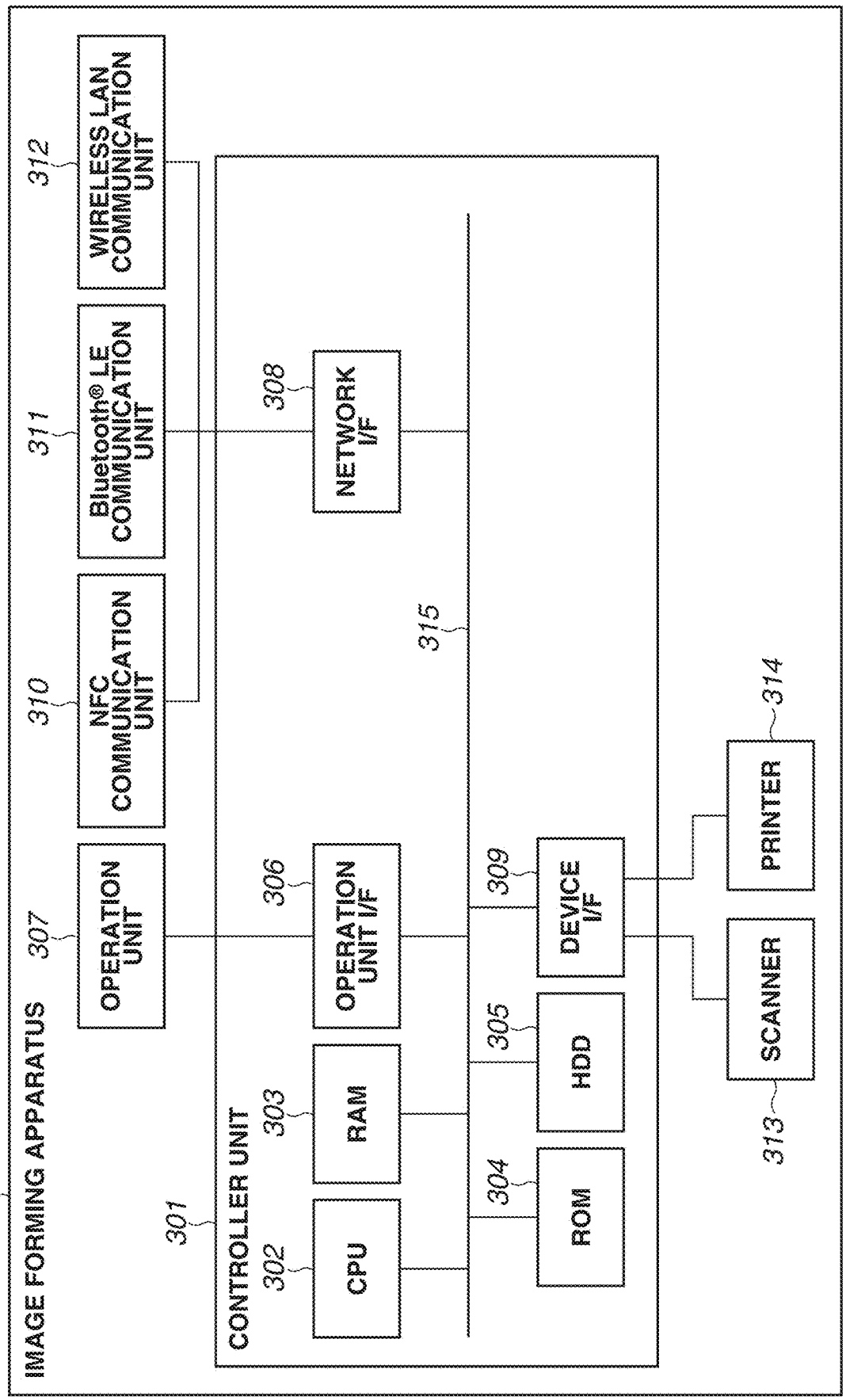
FIG. 3 is a diagram illustrating a hardware configuration of an image forming apparatus according to the present exemplary embodiment.

FIG. 3 is a diagram illustrating a hardware configuration of the image forming apparatus 104 according to the present exemplary embodiment. The image forming apparatus 104 includes a controller unit 301 that controls various kinds of communication units, i.e., an NFC communication unit 310, a Bluetooth® LE communication unit 311, and a wireless LAN communication unit 312, an operation unit 307, a scanner 313, and a printer 314. In a case where the user uses a copy function of the image forming apparatus 104, the controller unit 301 controls the scanner 313 to acquire image data of an original document, and controls the printer 314 to output an image on paper. In a case where the user uses a scan and send function, the controller unit 301 controls the scanner 313 to acquire image data of an original document and converts the image data to coded data. The controller unit 301 then sends the coded data to the data processing device 101, the cloud server 105, or the like via a network I/F 308. In a case where the user uses a print function, the controller unit 301 receives the image data (coded data) from the data processing device 101 or the cloud server 105 via the network I/F 308. The controller unit 301 then sends the received image data to the printer 314. The printer 314 prints an image on paper as an output on the basis of the received image data. The image forming apparatus 104 also has a fax receiving function to receive data from an integrated services digital network (ISDN) or the like and print the data, and a fax sending function to send scanned data to the ISDN or the like. Work to be processed according to the setting or the like set by the user to execute each function described above is referred to as a job, and the image forming apparatus 104 executes predetermined processing in accordance with the job.

The controller unit 301 includes a CPU 302, a RAM 303, a ROM 304, a hard disk drive (HDD) 305, an operation unit I/F 306, the network I/F 308, and a device I/F 309, which are connected with one another by a system bus 315.

The CPU 302 controls the whole system of the image forming apparatus 104. The RAM 303 is a system work memory for the CPU 302 to operate, and image data or the like is temporarily stored in the RAM 303. In addition, scanned image data read by the scanner 313, print image data received from the data processing device 101 via the network 103, or the like is stored in the RAM 303. The system's boot program, an application, and the like are stored in the ROM 304. An operating system, system software, application software, image data, setting data, and the like are stored in the HDD 305.

The operation unit I/F 306 outputs information to be displayed on the operation unit 307 to the operation unit 307. The operation unit I/F 306 also accepts information input by the user from the operation unit 307. The network I/F 308 is connected with the NFC communication unit 310, the Bluetooth® LE communication unit 311, and the wireless LAN communication unit 312, and exchanges data with the data processing device 101 and the cloud server 105 via various kinds of wireless communication. The wireless LAN communication unit 312 performs wireless LAN communication with the data processing device 101 via the network 103. The NFC communication unit 310 and the Bluetooth® LE communication unit 311 perform short-range wireless communication with the data processing device 101. The image forming apparatus 104 receives job setting information, image data, a job execution command, and the like from the data processing device 101, and executes a job. The device I/F 309 connects the scanner 313 and the printer 314 for reading image data and executing print with the controller unit 301, and inputs/outputs the image data.

Figure 4:
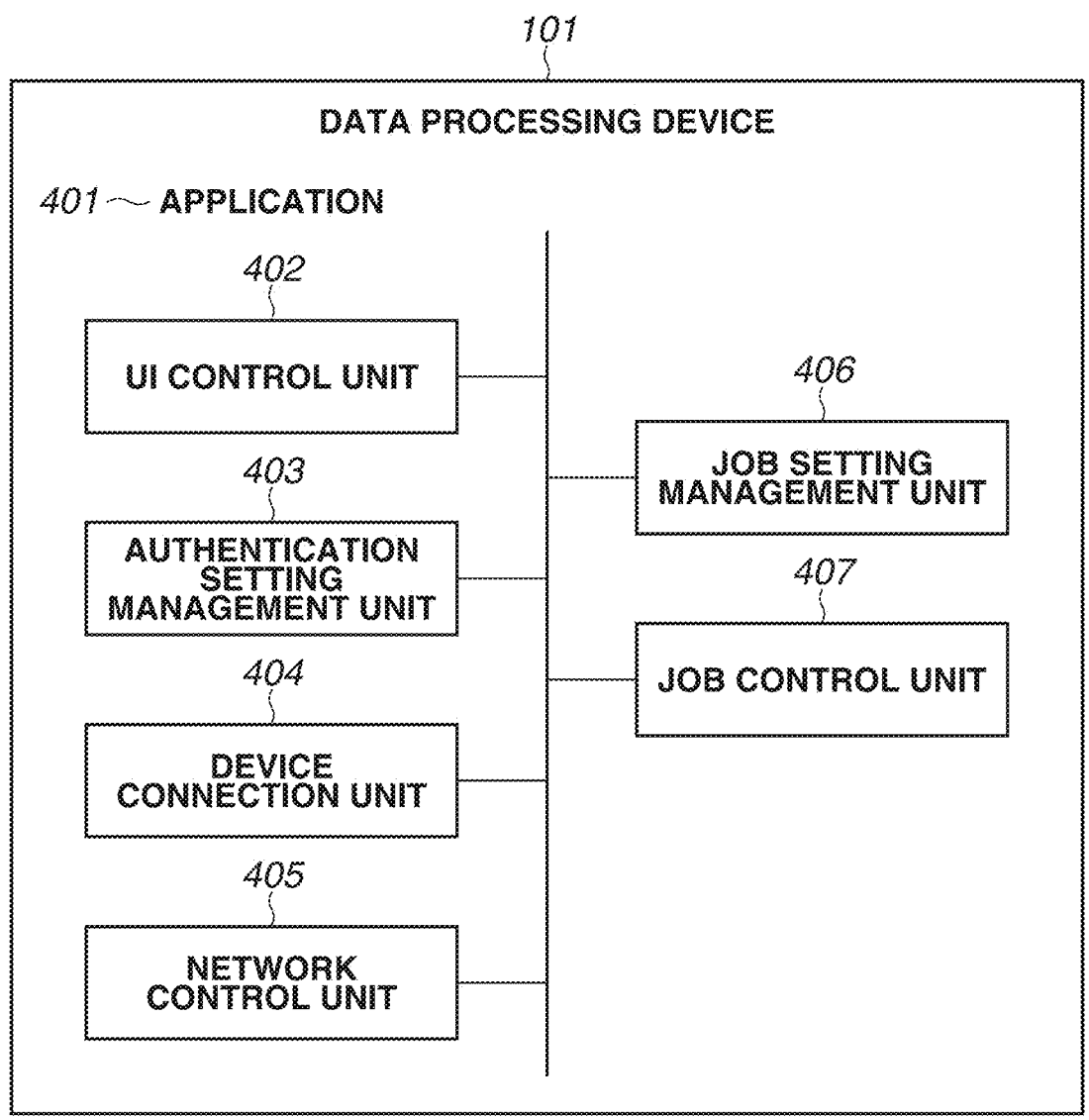
FIG. 4 is a block diagram illustrating a software configuration of the data processing device according to the present exemplary embodiment.

FIG. 4 is a diagram illustrating a software configuration of the data processing device 101 according to the present exemplary embodiment. FIG. 4 is a functional block diagram of software implemented by the CPU 202 reading a control program stored in the ROM 203 or the storage device 209.

An application 401 is an application installed in the data processing device 101. The user performs setting on the application 401 to create a job, and the job can be sent to the image forming apparatus 104. While various applications other than the application 401 are installed in the data processing device 101, a description thereof is omitted. A configuration of the application 401 will be described below.

A UI control unit 402 accepts job setting information or the like input to the touch panel 215 by the user, and sends an accepted content to a job setting management unit 406 via the input control unit 208. The UI control unit 402 also receives a response from the job setting management unit 406 or the job control unit 407, and outputs a screen in accordance with the received content on the display 214 via the display control unit 207. The UI control unit 402 yet also accepts user information input to the touch panel 215 by the user and authentication information for a log-in to the image forming apparatus 104, such as a password, and sends the accepted information to an authentication setting management unit 403 via the input control unit 208.

The authentication setting management unit 403 registers therein the authentication information received from the UI control unit 402. The authentication setting management unit 403 then performs processing for the log-in to the image forming apparatus 104 on the basis of the authentication information. Specifically, the authentication setting management unit 403 hands off the authentication information to a network control unit 405. The authentication information is sent to the image forming apparatus 104 via the network 103. The image forming apparatus 104 performs log-in processing using the received authentication information, and returns a result to the data processing device 101.

A device connection unit 404 establishes short-range wireless communication using the NFC or the Bluetooth® LE or wireless LAN communication via the network 103 between the data processing device 101 and the image forming apparatus 104. For example, in the case of the NFC, the short-range wireless communication is started by the user bringing the NFC communication unit 210 of the data processing device 101 close to the NFC communication unit 310 of the image forming apparatus 104. In the case of the Bluetooth® LE, the Bluetooth® LE communication unit 311 of the image forming apparatus 104 sends a Bluetooth® LE beacon, and the Bluetooth® LE communication unit 211 of the data processing device 101 receives the sent beacon. In a case where the device connection unit 404 determines that a radio field intensity of the beacon received by the data processing device 101 reaches a predetermined intensity or higher by the user bringing the data processing device 101 close to the image forming apparatus 104, the short-range wireless communication is started. In this manner, the device connection unit 404 performs the short-range wireless communication with the image forming apparatus 104 by the user bringing the NFC communication unit 210 of the data processing device 101 close to the NFC communication unit 310 of the image forming apparatus 104 or bringing the Bluetooth® LE communication unit 211 of the data processing device 101 close to the Bluetooth® LE communication unit 311 of the image forming apparatus 104. The device connection unit 404 acquires device information including connection information to be used for wireless LAN communication from the image forming apparatus 104 via the short-range wireless communication. The device connection unit 404 starts wireless LAN communication with the image forming apparatus 104 via the network 103 using the acquired connection information.

The network control unit 405 sends job setting information, a job execution command, image data, user authentication information, and the like to the image forming apparatus 104 via the network 103. In a case of configuring a job to send scanned image data to a set destination, the job setting information is setting information regarding a destination to which data is sent, a scan setting, and the like. The network control unit 405 also receives the job setting information and the like stored in the image forming apparatus 104 via the network 103.

The job setting management unit 406 stores job setting information input by the user and accepted by the UI control unit 402 and job setting information received by the network control unit 405 from the image forming apparatus 104 or the cloud server 105 in the RAM 204 or the storage device 209. In this operation, the job setting management unit 406 may register these pieces of job setting information as "favorites" as settings frequently used by the user. In addition, the job setting management unit 406 may register predetermined setting information as "preset" at the time of installation of the application 401.

The job control unit 407 generates a job from the job setting information included in the "favorites" or "preset" registered in the job setting management unit 406 or job setting information set by a user operation, and sends a job execution instruction to the image forming apparatus 104 via the network 103. In addition, the job control unit 407 also acquires a job execution situation and a device operation status of the scanner 313 or printer 314 from the image forming apparatus 104 via the network 103, and sends the job execution situation and the device operation status to the UI control unit 402.

Figure 5:
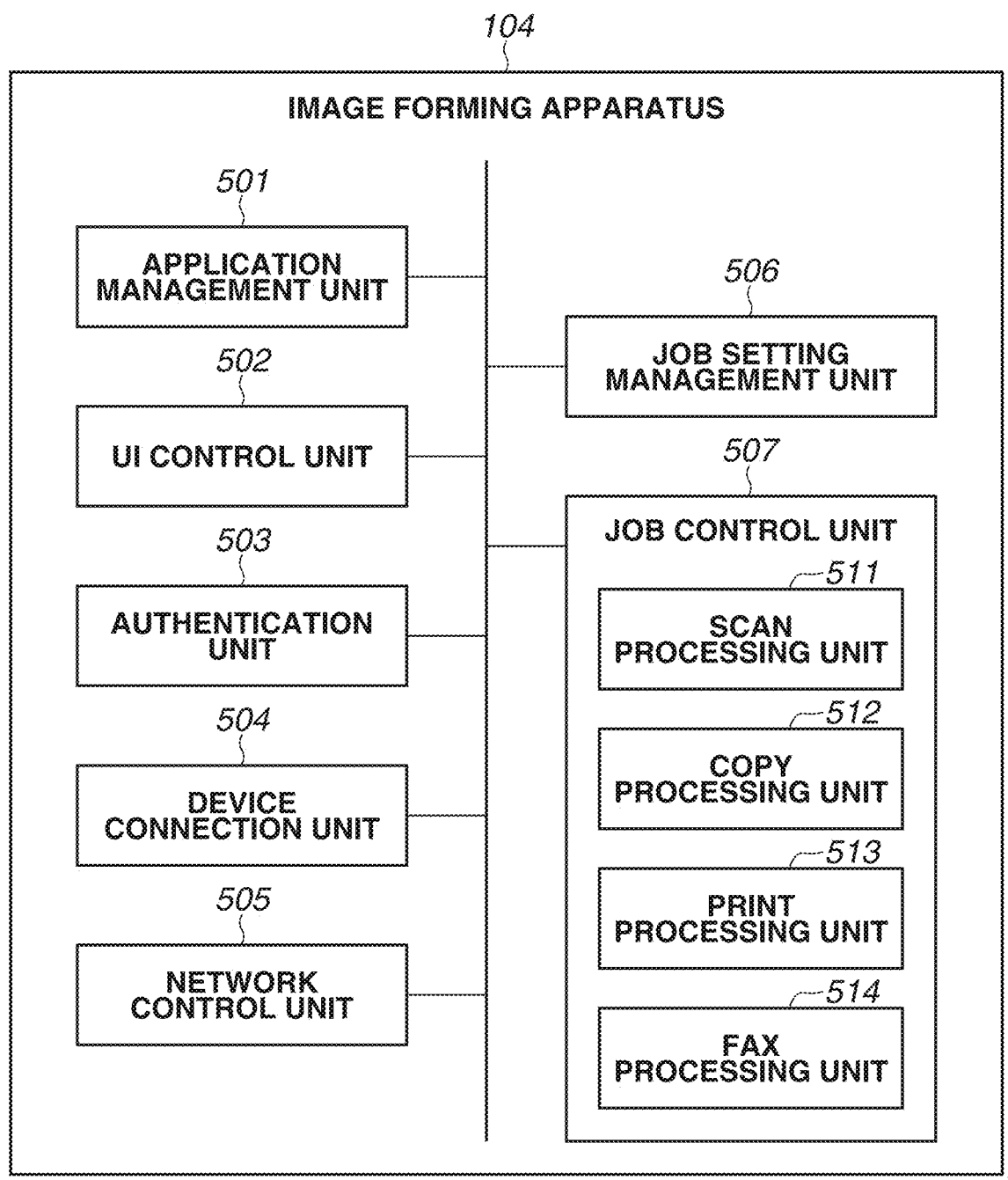
FIG. 5 is a block diagram illustrating a software configuration of the image forming apparatus according to the present exemplary embodiment.

FIG. 5 is a diagram illustrating a software configuration of the image forming apparatus 104 according to the present exemplary embodiment. FIG. 5 is a functional block diagram of software implemented by the CPU 302 reading a control program stored in the ROM 304 or the HDD 305.

The application management unit 501 manages an application that operates on the image forming apparatus 104. A UI control unit 502 accepts job setting information and the like input by the user via the operation unit 307, and hands off the job setting information to a job setting management unit 506. In addition, the UI control unit 502 receives a response from the job setting management unit 506 or a job control unit 507, and outputs a screen in accordance with the response to the operation unit 307.

An authentication unit 503 performs log-in processing on the basis of authentication information received from the data processing device 101, and returns a result. The image forming apparatus 104 holds various kinds of information such as an e-mail address corresponding to a log-in user.

A device connection unit 504 establishes wireless LAN communication via short-range wireless communication with the data processing device 101. A network control unit 505 receives job setting information, a job execution instruction command, image data, user authentication information, and the like from the data processing device 101 via the network 103. The network control unit 505 also sends job setting information stored in the image forming apparatus 104 to the data processing device 101 via the network 103.

In the RAM 303 or the HDD 305, the job setting management unit 506 stores job setting information input by the user and accepted by the UI control unit 502 and job information including job setting information received from the data processing device 101 or the cloud server 105 by the network control unit 505. In this operation, the job setting management unit 506 may register these pieces of job setting information as "favorites" as settings frequently used by the user. In addition, the job setting management unit 506 may register predetermined setting information as "preset". The job setting management unit 506 also manages jobs executed in the image forming apparatus 104 as "history".

The job control unit 507 controls units including a scan processing unit 511, a copy processing unit 512, a print processing unit 513, and a fax processing unit 514 in accordance with the received job information and executes various kinds of jobs. In this operation, the job control unit 507 executes various kinds of jobs using job setting information set by the user on the operation unit 307 and job setting information registered as the "favorites" or the "preset" by the job setting management unit 506. The job control unit 507 also receives a job execution request received from the data processing device 101 or the like via the network 103, and executes various kinds of jobs in accordance with the received job setting information and job execution instruction. The job control unit 507 yet also sends a job execution situation and a device operation status of the scanner 313 or printer 314 to the data processing device 101 via the network 103.

Figure 6:
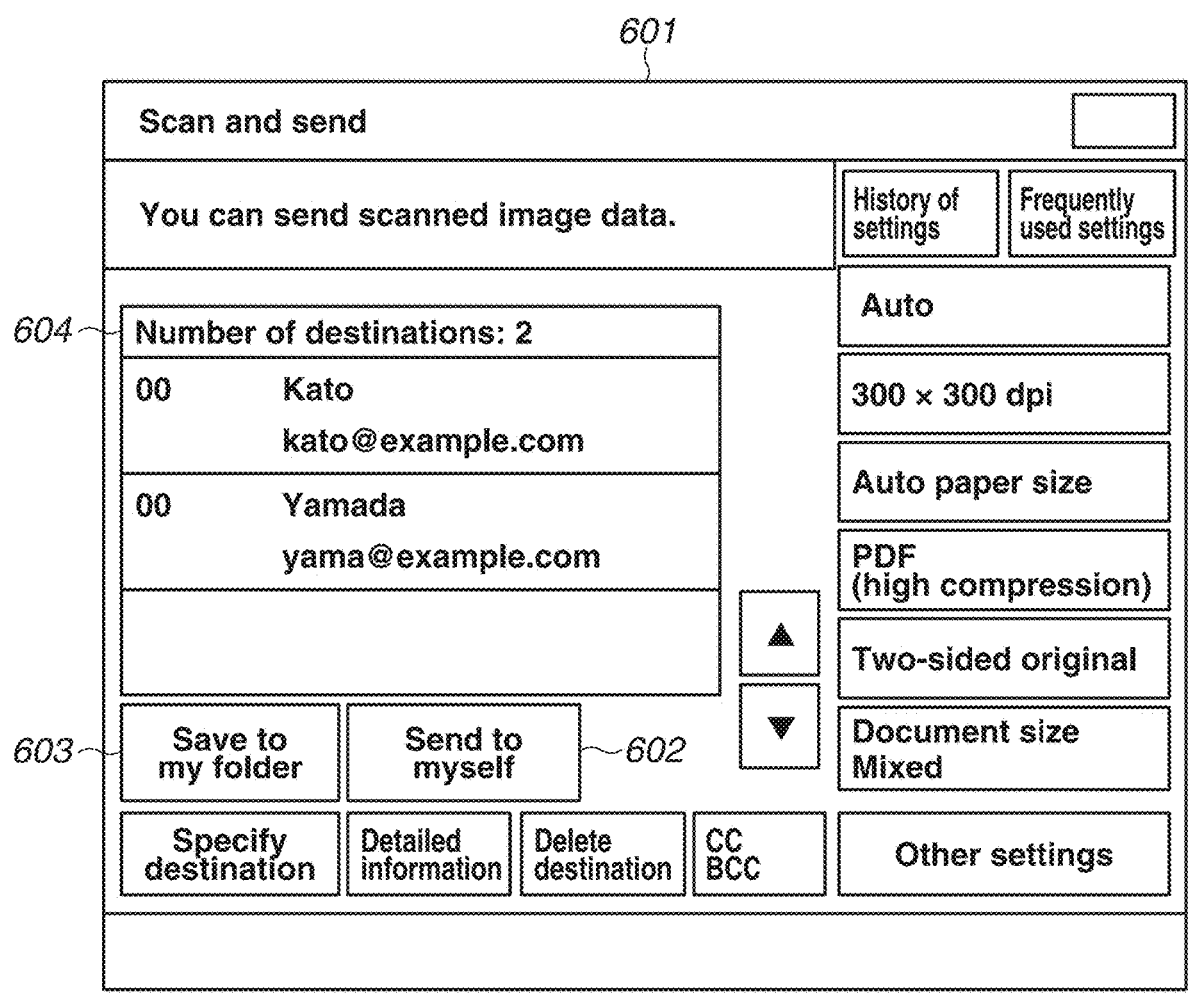
FIG. 6 is a diagram illustrating an example of a sending setting screen of the image forming apparatus according to the present exemplary embodiment.

FIG. 6 illustrates an example of a setting screen to send scanned image data to a set destination. The setting screen is displayed on the image forming apparatus 104. The setting screen is a screen that is displayed by the user calling an application to perform a scan and send operation on the image forming apparatus 104.

A screen 601 is a screen to set a sending destination. On the screen 601, the sending destination can be selected and a scan setting can be performed. A send-to-myself button 602 is a button to add an e-mail address corresponding to a log-in user as a sending destination by being pressed in a case where the e-mail address corresponding to the log-in user is preliminarily registered in the image forming apparatus 104. While, in the present exemplary embodiment, an administrator of the image forming apparatus 104 can register a list that associates identification (ID) of each user who can log in to the image forming apparatus 104 with an e-mail address of each user, the configuration is not limited thereto. For example, each user may be able to preliminarily register and change his/her own e-mail address. A save-to-my-folder button 603 is a button to add, in a case where the log-in user registers a specific destination to save (my folder), my folder as a sending destination. In a case where my folder has yet to be registered, the destination for saving can be set and registered by pressing the save-to-my-folder button 603. An e-mail address as a sending destination and the like are displayed in a destination list 604.

Figure 7:
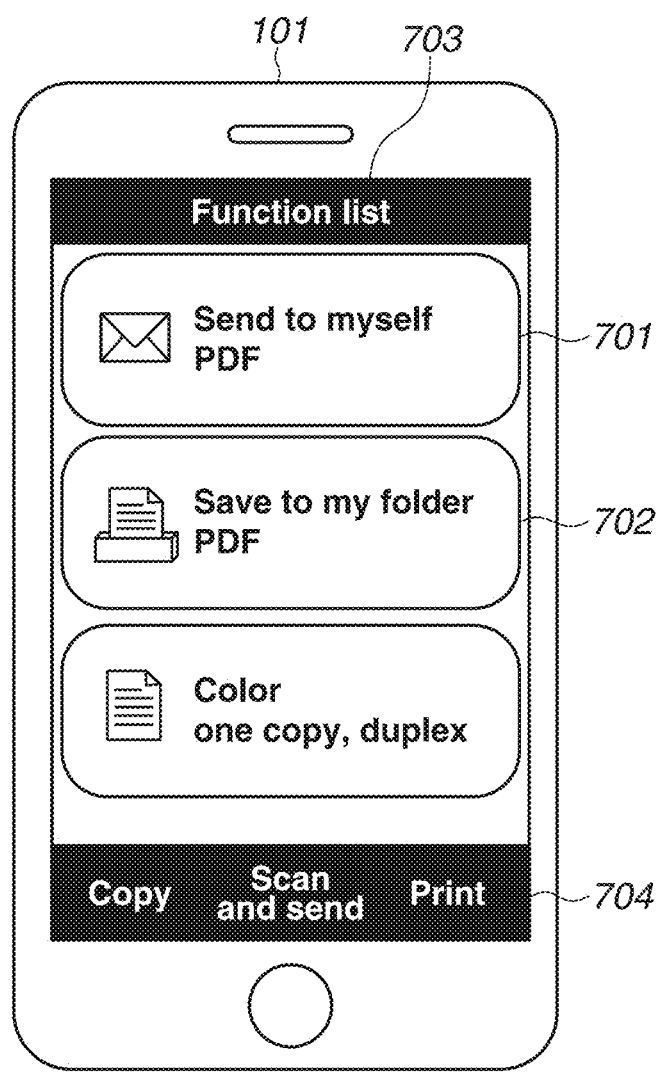
FIG. 7 is a diagram illustrating an example of a menu screen of the data processing device according to the present exemplary embodiment.

A description will be given of selection of a function of the application 401 on the data processing device 101 with reference to FIG. 7. FIG. 7 illustrates a menu screen of the application 401 that operates on the data processing device 101. The application 401 can communicate with the image forming apparatus 104 and issue an instruction to execute processing based on contents set on the application 401 to the image forming apparatus 104.

On a menu screen 703 of the application 401, the UI control unit 402 displays a list of processing that uses functions of the image forming apparatus 104. The displayed list includes jobs registered as, for example, the "favorites" and the "preset" described above. The list displays, for example, a send-to-myself button 701 to send scanned image to a user (who has logged in to the image forming apparatus 104) by e-mail, and a save-to-my-folder button 702 to save the scanned image to a user's registered folder. In a case where the send-to-myself button 701 is pressed, the screen transits to a send-to-myself setting screen 710 to send an e-mail to the user. In a case where the save-to-my-folder button 702 is pressed, the screen transits to a setting screen (not illustrated) to save the scanned image to my folder. A plurality of buttons to execute jobs that use basic functions of the image forming apparatus 104, such as a "copy" button and a "print" button is arranged in a basic job button area 704. In a case where any of the buttons is pressed, the screen transits to a corresponding setting screen to execute a job.

Figure 9:
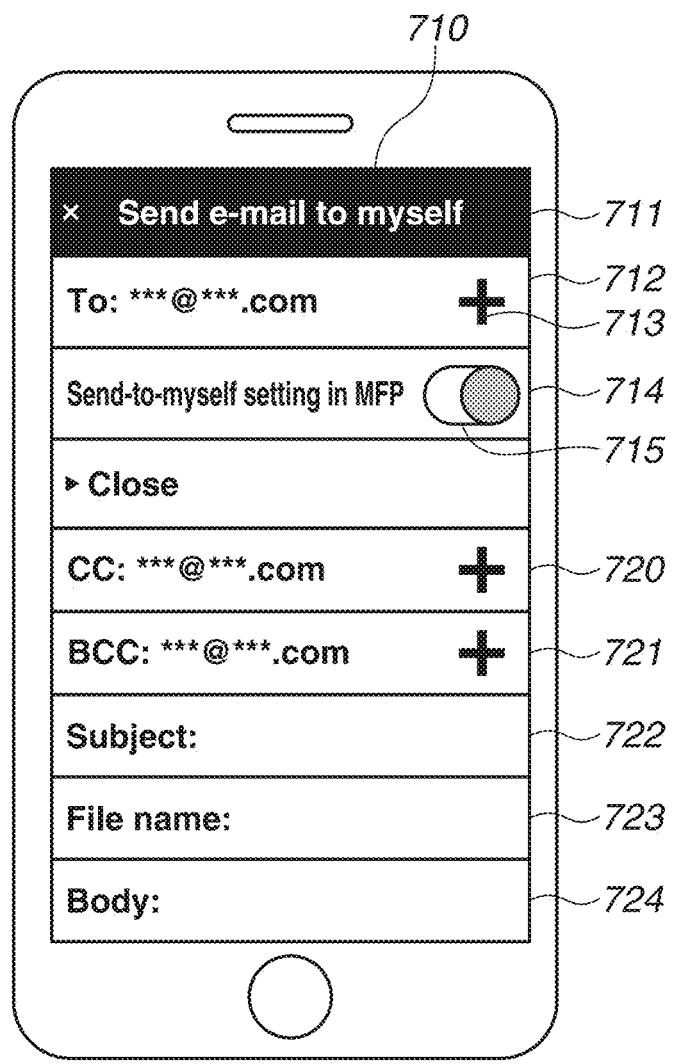
FIG. 9 is a diagram illustrating an example of a send-to-myself screen of the data processing device according to the present exemplary embodiment.
Figure 10:
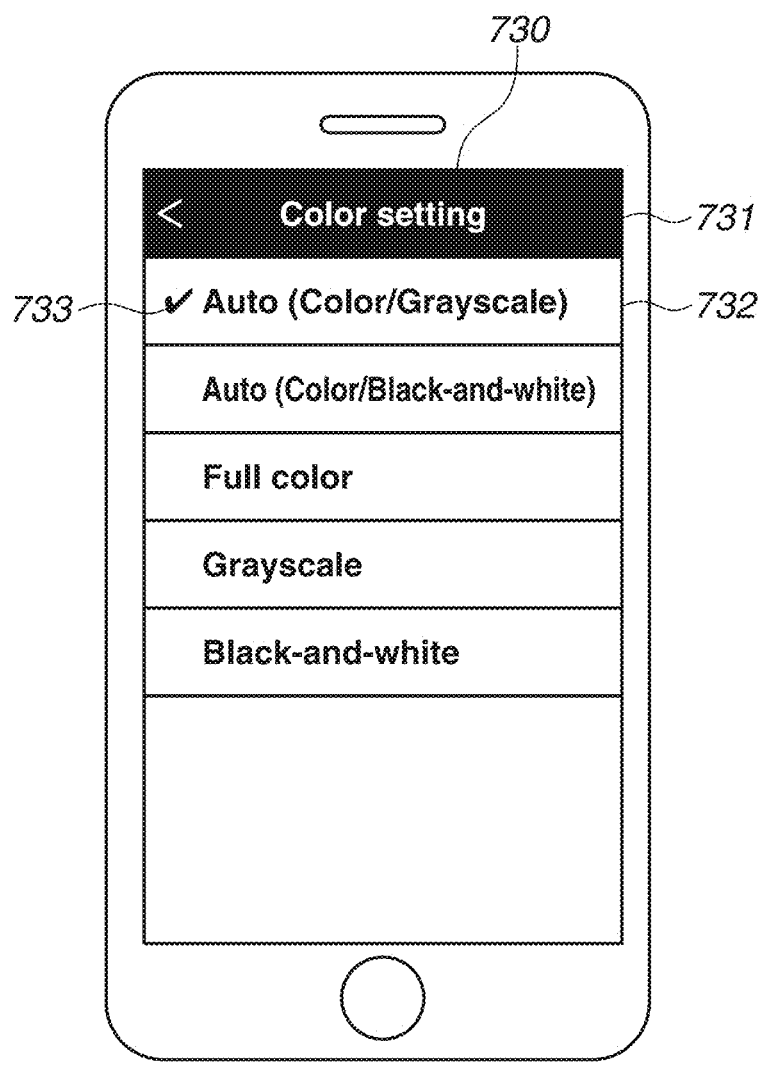
FIG. 10 is a diagram illustrating an example of a color setting screen of the data processing device according to the present exemplary embodiment.

Before referring to FIGS. 8 to 10, an overview of the present exemplary embodiment will be described. In a case where the user presses the send-to-myself button 701, performs a setting on the setting screen, and brings the data processing device 101 in touch with the image forming apparatus 104, the user can send image data scanned by the image forming apparatus 104 to the user. In the conventional operation, the user inputs the user's e-mail address on the setting screen of the data processing device 101. In this regard, in the present exemplary embodiment, the user instructs the image forming apparatus 104 to use the user's e-mail address preliminarily registered in the image forming apparatus 104 on the data processing device 101. Accordingly, the user can instruct to send image data to the user without setting the user's e-mail address on the data processing device 101.

A description will be given of a setting that is performed on the data processing device 101 to send scanned image to the user with reference to FIGS. 8, 9, and 10.

Figure 8:
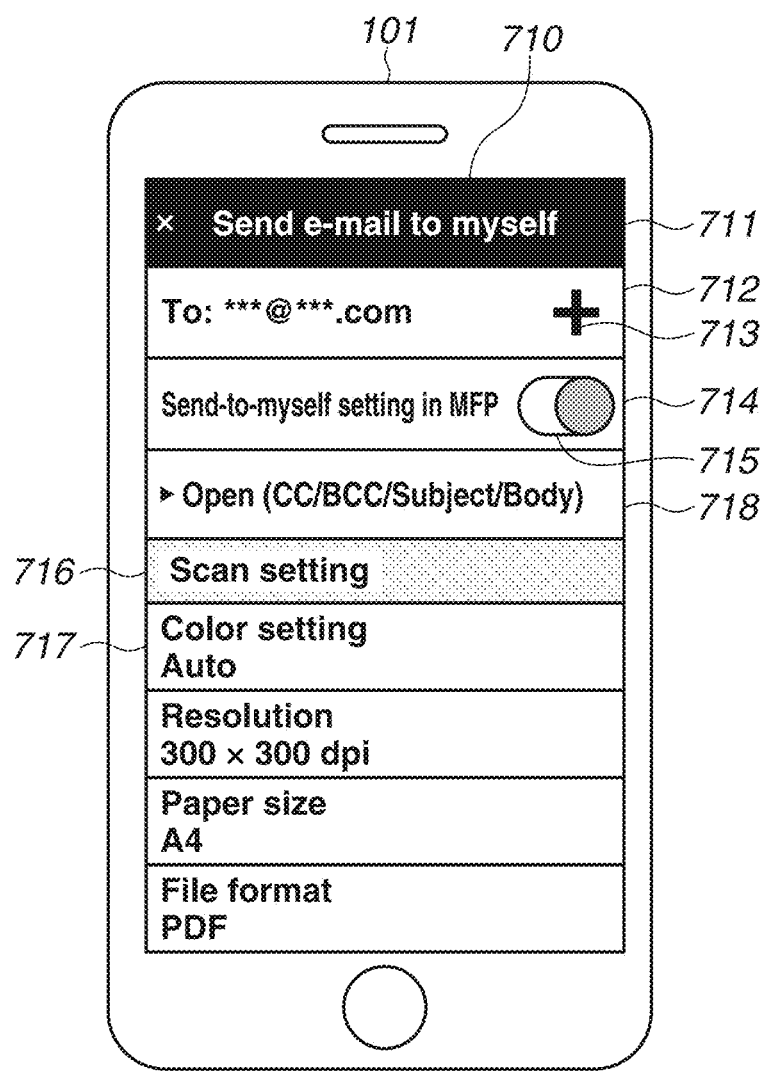
FIG. 8 is a diagram illustrating an example of a send-to-myself screen of the data processing device according to the present exemplary embodiment.

The send-to-myself setting screen 710 illustrated in FIG. 8 is a screen to perform a setting to send scanned image to the user by e-mail, and the screen is displayed by the send-to-myself button 701 being pressed on the screen illustrated in FIG. 7. In a title area 711, a title indicating what kind of a setting is to be performed on the screen ("send e-mail to myself" in FIG. 8) is displayed, and a button to be used to cancel the setting and go back to the menu screen is also disposed. An e-mail address setting area 712 is an area to display the set e-mail address. In a case where the area is pressed, the e-mail address as the sending destination can be directly input by software keys. In a case where an address book open button 713 is pressed, an address book in the data processing device 101 opens. In a case where the user selects an e-mail address from the address book that has opened, the selected e-mail address is displayed in the e-mail address setting area 712. A plurality of e-mail addresses can be set. In a send-to-myself-setting-in-MFP setting area 714, a switching button 715 is used to switch whether or not to cause the image forming apparatus 104 to execute a function corresponding to that of the send-to-myself button 602 of a multi-function peripheral (MFP) (as an example of the image forming apparatus 104). That is, whether or not to use the user's e-mail address registered in the image forming apparatus 104 can be switched by the switching button 715. In the present exemplary embodiment, the switching button 715 in the send-to-myself-setting-in-MFP setting area 714 is ON by default. In a case where an open button 718 is pressed, the screen transits to a screen illustrated in FIG. 9, and settings regarding a subject of an e-mail, a body, and the like can be set.

A CC input area 720 and a BCC input area 721 each have the same configuration of that of the e-mail address setting area 712, and an e-mail address to which an e-mail is sent can be input thereto. A subject field 722 to which a subject is input, and a file name field 723, a body field 724 to which a body is input can be input by software keys of the data processing device 101, and the user can input any character strings thereto.

The description returns to FIG. 8. Buttons, for changing the scan setting, including a color setting button 717 are disposed below a scan setting area 716. In a case where the color setting button 717 is pressed, the screen transits to a color setting screen 730 illustrated in FIG. 10. In a title area 731, a title indicating that the screen is the "color setting" screen is displayed, and a back button to confirm the setting and return to the previous screen is disposed. Setting items 732 display items regarding the color setting. In a case where any one of these items is pressed, the item is changed to a selected status as illustrated in a status 733.

After various kinds of settings are performed on the send-to-myself setting screen 710, and in a case where the user brings the data processing device 101 in touch with the image forming apparatus 104, the data processing device 101 sends the settings performed on the send-to-myself setting screen 710 to the image forming apparatus 104. The image forming apparatus 104 then executes sending processing based on the received settings.

A save-to-my-folder setting screen (not illustrated) displayed by the save-to-my-folder button 702 illustrated in FIG. 7 being pressed has a configuration equivalent to the send-to-myself setting screen illustrated in FIG. 8. The send-to-myself-setting-in-MFP setting area 714 illustrated in FIG. 8 is replaced with an area for determining whether to execute a function corresponding to that of the save-to-my-folder button 603. In a case where the setting is ON, the user's folder preliminarily registered in the image forming apparatus 104 is set to a sending destination of data.

Figure 11:
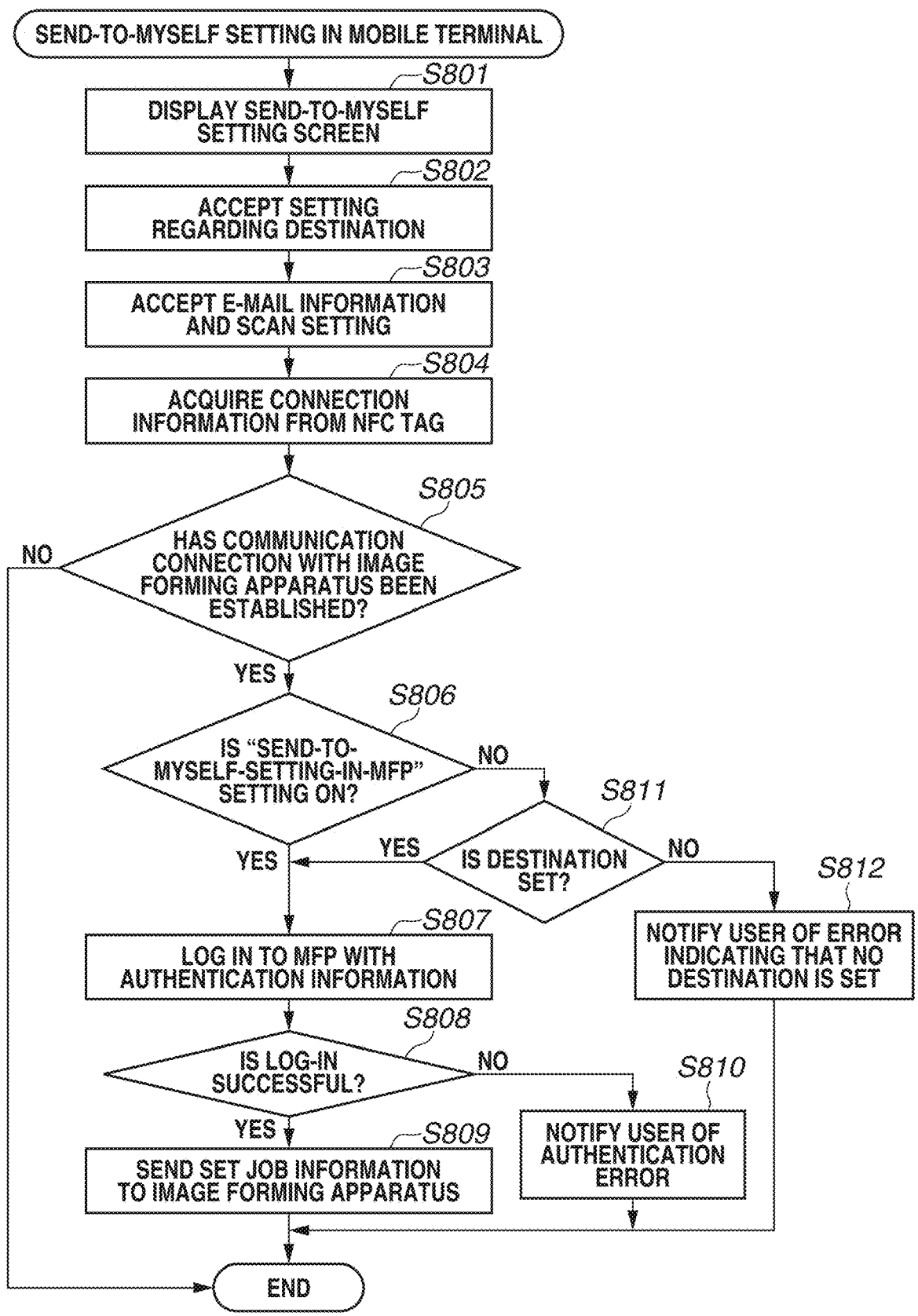
FIG. 11 is a flowchart describing processing for executing a send-to-myself operation in the data processing device according to the present exemplary embodiment.

A description will be given of the processing procedure of the data processing device 101 in a case where various kinds of settings are performed on the send-to-myself setting screen 710 and the user brings the data processing device 101 in touch with the image forming apparatus 104, using a flowchart for sending illustrated in FIG. 11. Each step illustrated in the flowchart is processed by the CPU 202 loading a control program (application) stored in a memory, such as the ROM 203 and the storage device 209, to the RAM 204 and executing the program.

In step S801, the send-to-myself button 701 on the menu screen 703 illustrated in FIG. 7 is pressed, and the UI control unit 402 displays the send-to-myself setting screen 710. In step 802, the CPU 202 accepts a setting regarding a sending destination. Specifically, the CPU 202 accepts an e-mail address setting performed in the e-mail address setting area 712 and switching by the switching button 715 of whether or not to execute the send-to-myself operation of the MFP. In step S803, the CPU 202 accepts an input regarding e-mail information, such as a scan setting performed in the scan setting area 716, the subject field 722, the file name field 723, and the body field 724. Since, in the present exemplary embodiment, the switching button 715 is ON by default and also a default value is set to the scan setting, steps S802 and S803 are not necessarily required, and the order of steps are not limited to this order. That is, the processing can proceed to the next step without the processing of accepting the sending destination, the scan setting, and the like.

In step S804, after the user brings the data processing device 101 in touch with the image forming apparatus 104, the device connection unit 404 acquires connection information on wireless LAN communication from an NFC tag of the image forming apparatus 104. In step S805, the CPU 202 determines whether the data processing device 101 has established communication connection with the image forming apparatus 104 using the connection information. In a case where the data processing device 101 has not established the communication connection (NO in step S805), the UI control unit 402 displays a message indicating a failure to communicate on the data processing device 101, and the processing ends. In a case where the data processing device 101 has established the communication connection (YES in step S805), the processing proceeds to step S806. In step S806, the CPU 202 determines whether the setting in the send-to-myself-setting-in MFP setting area 714 is ON or OFF. In a case where the setting in the send-to-myself-setting-in-MFP setting area 714 is ON (YES in step S806), the processing proceeds to step S807. In step S807, the CPU 202 sends authentication information registered in the authentication setting management unit 403 to the image forming apparatus 104, and performs log-in processing to the image forming apparatus 104. The communication established in step S805 is used for the sending in this operation. In step S808, the CPU 202 receives a result of the log-in processing from the image forming apparatus 104 and determines whether the log-in is successful. In a case where the log-in is successful (YES in step S808), the processing proceeds to step S809. In step S809, the network control unit 405 sends job setting information (an e-mail address, a send-to-myself setting in the MFP, a scan setting, e-mail information, and the like) set on the send-to-myself setting screen 710 and job information including an execution command to the image forming apparatus 104. The communication established in step S805 is used for the sending in this operation. In a case where the network control unit 405 receives a message that the log-in is failed, the processing proceeds to step S810. In step S810, the UI control unit 402 displays an authentication error on the screen, and the processing ends.

In a case where the setting in the send-to-myself-setting-in-MFP setting area 714 is OFF (NO in step S806), the processing proceeds to step S811. In step S811, the CPU 202 determines whether an e-mail address is set in the e-mail address setting area 712. In a case where the e-mail address is set in the e-mail address setting area 712 (YES in step S811), the processing proceeds to step S807. In a case where no e-mail address is set in the e-mail address setting area 712 (NO in step S811), the processing proceeds to step S812. In step S812, the UI control unit 402 displays an error message that "no destination is set" on the screen, and the processing ends. In this flowchart, the data processing device 101 acquires the connection information from the image forming apparatus 104 via the NFC communication and establishes wireless LAN communication with the image forming apparatus 104 using the connection information to exchange various kinds of data with the image forming apparatus 104. However, the configuration is not limited thereto, and the data processing device 101 and the image forming apparatus 104 may exchange various kinds of data via Bluetooth® communication. Alternatively, the data processing device 101 may acquire connection information by reading a quick response (QR) code displayed by the UI control unit 502 of the image forming apparatus 104, and perform wireless communication using the connection information.

Figure 12:
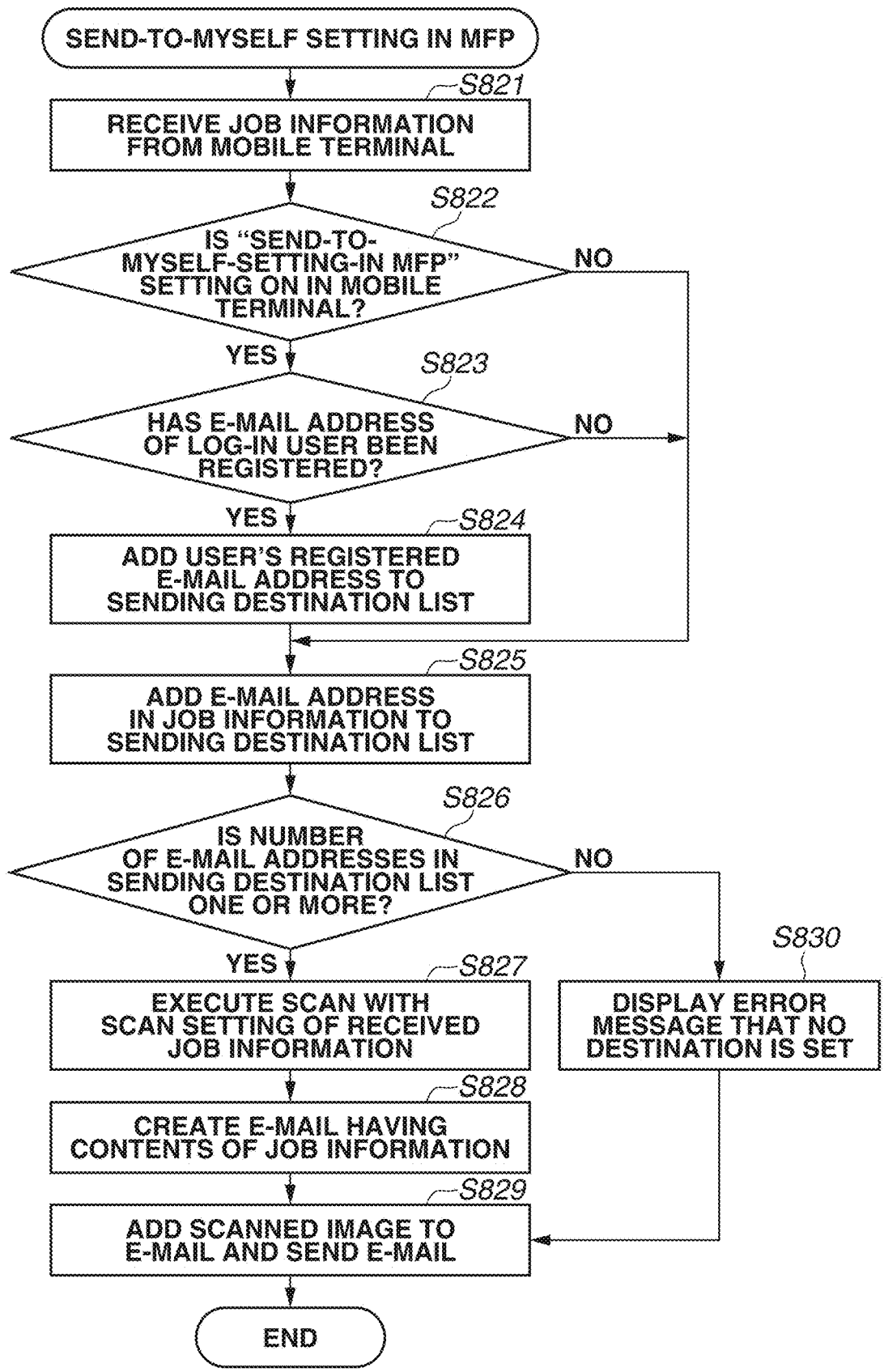
FIG. 12 is a flowchart describing processing for executing a send-to-myself operation in the image forming apparatus according to the present exemplary embodiment.

Subsequently, a description will be given of processing executed by the image forming apparatus 104 that has received the job information (the job information sent in step S809) including the job setting information set on the send-to-myself setting screen 710 on the data processing device 101, using the flowchart illustrated in FIG. 12. In this operation, the image forming apparatus 104 has received the authentication information sent from the data processing device 101 in step S807, and is in a state where the user of the data processing device 101 has logged in to the image forming apparatus 104. The image forming apparatus 104, which has received the authentication information and performed the log-in processing, may display a screen after the log-in.

Each step illustrated in the flowchart is processed by the CPU 302 loading a control program (application) stored in a memory, such as the ROM 304 and the HDD 305, to the RAM 303 and executing the program. In step S821, the network control unit 505 receives the job information sent in step S809 from the data processing device 101. In this processing, the CPU 302 may start an application to scan and send data, and the UI control unit 502 may display the screen 601. In step S822, the CPU 302 refers to the send-to-myself-setting-in-MFP setting in the received job information to determine whether the setting is ON or OFF. In a case where the setting is ON (YES in step S822), the processing proceeds to step S823. In step S823, the CPU 302 determines whether an e-mail address of the user who has logged in to the image forming apparatus 104 (for example, a personal e-mail address set in the user's personal computer (PC)) is registered in the image forming apparatus 104. In a case where the e-mail address has been registered (YES in step S823), the processing proceeds to step S824. In step S824, the CPU 302 adds the user's registered e-mail address to a sending destination list. In a case where the e-mail address has not been registered (NO in step S823), the processing proceeds to step S825.

In a case where the "send-to-myself" setting in the MFP is OFF (NO in step S822), the processing proceeds to step S825. In step S825, the CPU 302 extracts a list of e-mail address(es) as sending destination(s) included in the received job information (e-mail address(es) set in the e-mail address setting area 712 and the like), and adds the e-mail address(es) to the sending destination list. In step S826, the CPU 302 determines whether the number of e-mail addresses in the sending destination list is one or more. In a case where the number of e-mail addresses is one or more (YES in step S826), the processing proceeds to step S827. In step S827, the CPU 302 extracts a scan setting from the job information, and executes scan with the scan setting. In step S828, after the execution of the job is completed, the CPU 302 creates a sending e-mail including e-mail information. In this operation, the CPU 302 sets an e-mail address in the sending destination list as a destination. In step S829, the CPU 302 adds the scanned image scanned in step S827 to the e-mail created in step S828 and sends the email.

In a case where there is no e-mail address in the sending destination list in step S826 (NO in step S826), the processing proceeds to step S830. In step S830, the UI control unit 502 displays an error message that no destination is set, and the processing ends. In this operation, the error message may be displayed on the data processing device 101.

As described above, according to the present exemplary embodiment, the sending of the scanned image to the user's e-mail address registered in the image forming apparatus can be instructed from the data processing device (mobile terminal). This eliminates the need for the user inputting the user's e-mail address on the data processing device 101, and therefore usability is increased.

For example, there is a case where the user's e-mail address for work is not registered in an address book of the mobile terminal of the user. Meanwhile, user ID of each user who can use the image forming apparatus and each user's e-mail address for work are registered in the image forming apparatus by an administrator of the image forming apparatus. Under such circumstances, according to the present exemplary embodiment, the user can easily issue an instruction to send scanned image to the user's e-mail address for work without inputting the user's e-mail address for work on the mobile terminal.

While, in the present exemplary embodiment, settings are performed on the data processing device and then the data processing device is brought in touch with the image forming apparatus to start communication, the configuration is not limited thereto. The present exemplary embodiment is also applicable to a case where the data processing device and the image forming apparatus are in communication with each other, and the settings are performed on the data processing device and an instruction is then issued to the image forming apparatus. While, in the present exemplary embodiment, the description has been given of the example of using the function of the "send-to-myself" setting in the MFP on the data processing device, a case of using the save-to-my-folder setting in the MFP on the data processing device can be achieved by a similar configuration.

In the first exemplary embodiment, in a case where there is no e-mail address in the sending destination list in step S826 for such reasons as no e-mail address as a destination being set on the data processing device 101, the error message is displayed in step S830. In a second exemplary embodiment, a description will be given of an example in which the data processing device 101 automatically acquires a personal e-mail address of the data processing device 101, and sets the personal e-mail address as a destination of the send-to-myself operation. Since the basic configuration of the present exemplary embodiment is the same as that of the first exemplary embodiment, only a difference will be described.

Figure 13:
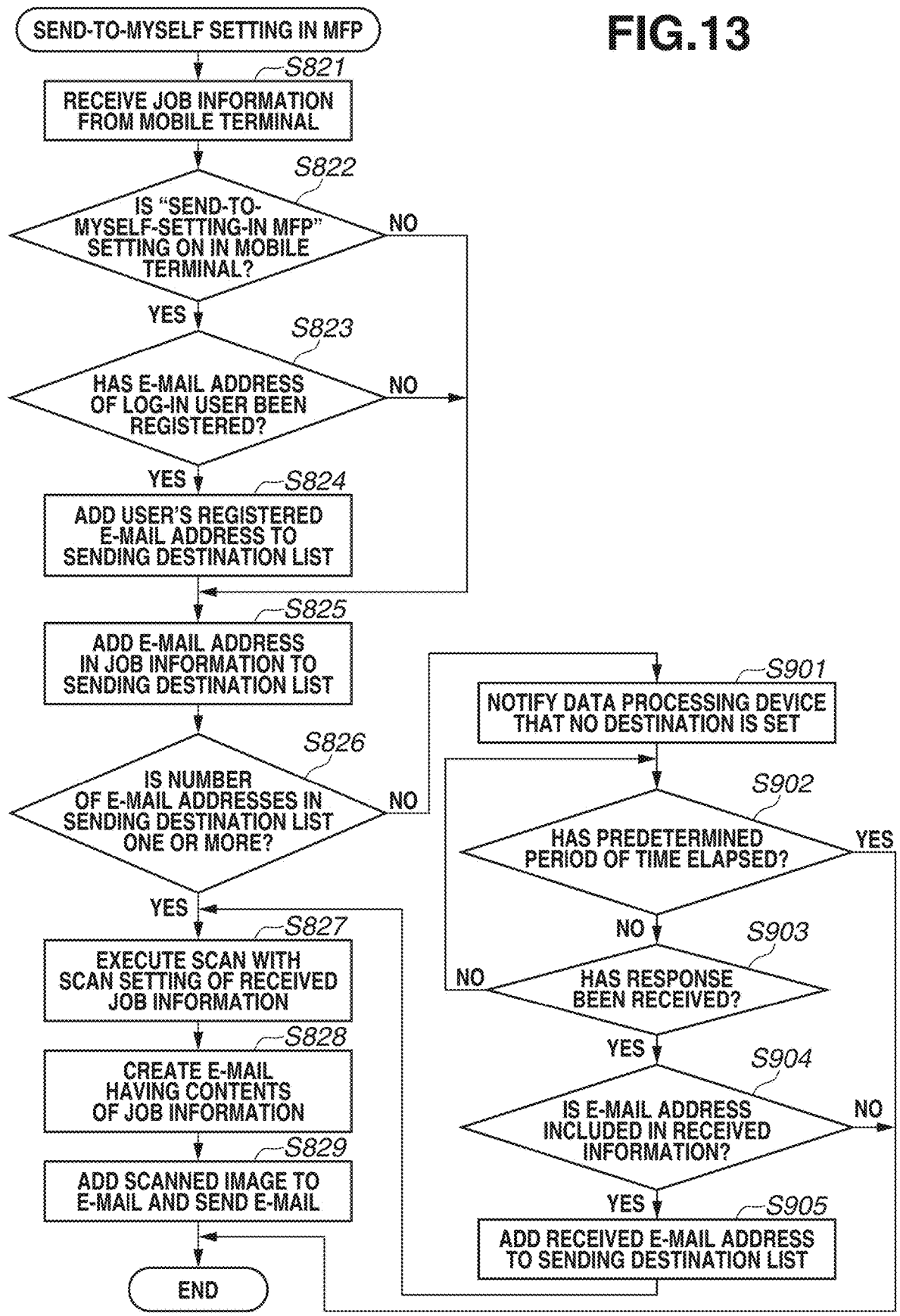
FIG. 13 is a flowchart describing processing for resetting an e-mail address in the image forming apparatus according to the present exemplary embodiment.

The processing procedure of the image forming apparatus 104 according to the present exemplary embodiment will be described using the flowchart illustrated in FIG. 13. Since the basic configuration of the flowchart in FIG. 13 is the same as that in FIG. 12, only a difference will be described. In a case where the CPU 302 of the image forming apparatus 104 performs determination of whether the number of e-mail addresses in the sending destination list is one or more, and then determines that there is no e-mail address in the sending destination list in step S826, the processing proceeds to step S901. In step S901, the CPU 302 notifies the data processing device 101 that no destination is set. In step S902, the CPU 302 determines whether a predetermined period of time has elapsed after the notification in step S901. In a case where the predetermined period of time has elapsed (YES in step S902), the UI control unit 502 displays an error message or the CPU 302 notifies the data processing device 101 of the error, and the processing ends. In a case where the predetermined period of time has not elapsed (NO in step S902), the processing proceeds to step S903. In step S903, the CPU 302 determines whether the image forming apparatus 104 has received a response from the data processing device 101. In a case where the CPU 302 has received no response (NO in step S903), the processing returns to step S902. In a case where the CPU 302 has received the response (YES in step S903), the processing proceeds to step S904. In step S904, the CPU 302 determines whether an e-mail address is included in the received response. In a case where the e-mail address is included in the received response (YES in step S904), the processing proceeds to step S905. In step S905, the CPU 302 adds the e-mail address included in the received response to the sending destination list, and then the processing proceeds to step S827. In a case where no e-mail address is included in the received response (NO in step S904), the CPU 302 cancels the processing and the UI control unit 502 displays an error message, and the processing ends.

Figure 14:
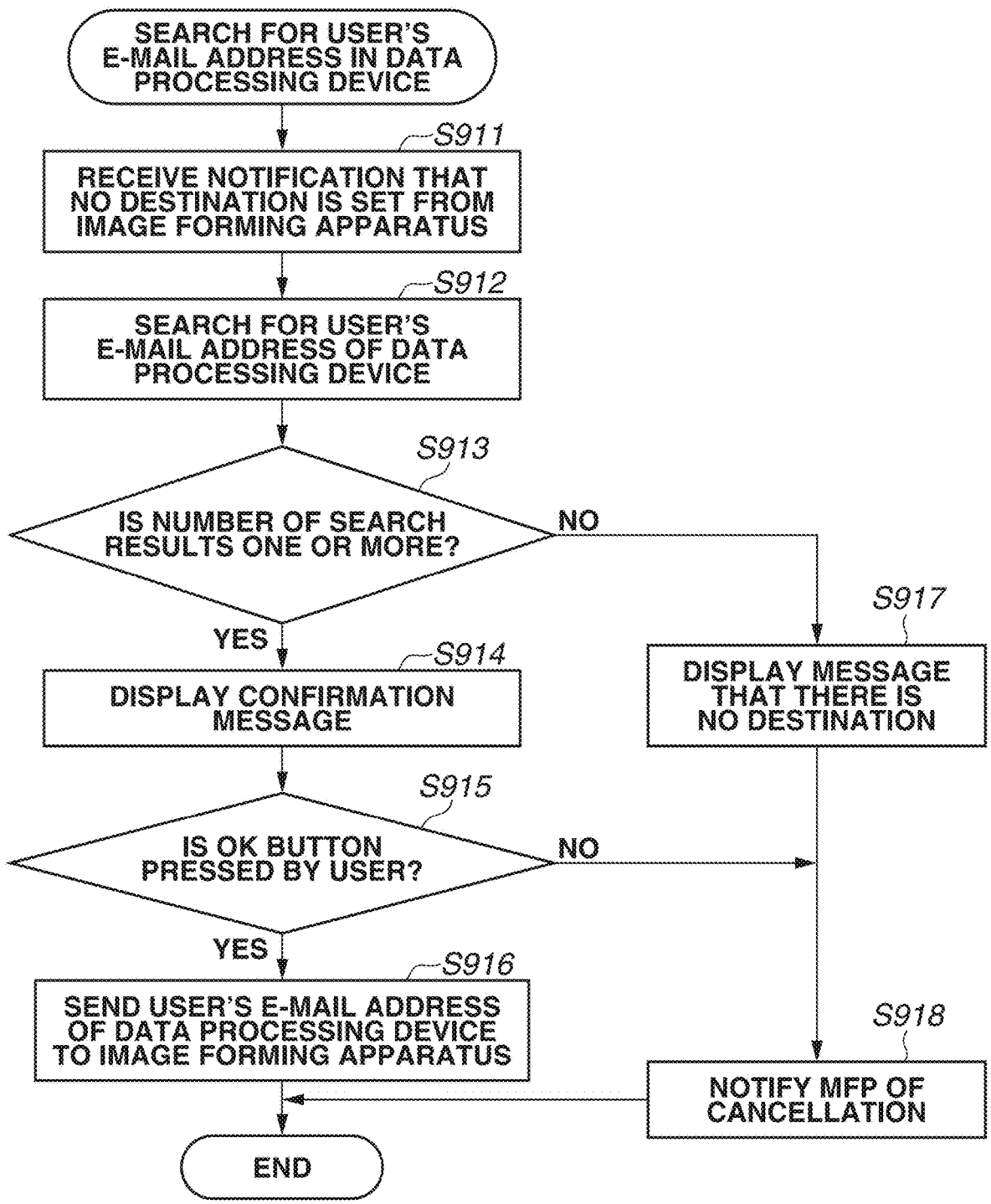
FIG. 14 is a flowchart describing processing for resetting an e-mail address in the data processing device according to the present exemplary embodiment.

The processing procedure executed by the data processing device 101 to search for the user's personal e-mail address of the data processing device 101, and send the searched e-mail address to the image forming apparatus 104 will be described using the flowchart illustrated in FIG. 14.

In step S911, the CPU 202 of the data processing device 101 receives the notification indicating that no destination is set from the image forming apparatus 104 in step S901. In step S912, the CPU 202 searches for the user's personal e-mail address of the data processing device that is set to the data processing device 101. The user's personal e-mail address of the data processing device 101 mentioned herein is, a personal e-mail address set to the operating system of the data processing device 101, such as a carrier e-mail address and a Gmail address. In step S913, the CPU 202 determines whether the number of e-mail addresses searched in step S912 is one or more. In a case where the number of e-mail addresses is one or more (YES in step S913), the processing proceeds to step S914. In step S914, the UI control unit 402 displays a screen (not illustrated) including a message for making a user's confirmation of the personal e-mail address(es) to be sent to the image forming apparatus 104, together with OK and cancel buttons. In step S915, the CPU 202 determines whether a pressed button is the OK button. In a case where the pressed button is the OK button (YES in step S915), the processing proceeds to step S916. In step S916, the CPU 202 sends the e-mail address(es) searched in step S912 to the image forming apparatus 104, and the processing ends. In a case where the pressed button is the cancel button (NO in step S915), the processing proceeds to step S918. In step S918, the CPU 202 notifies the image forming apparatus 104 of cancellation of the job, and the processing ends.

In a case where no e-mail address can be searched (NO in step S913), the processing proceeds to step S917. In step S917, the UI control unit 402 displays a message that there is no e-mail address on the data processing device 101, and the processing proceeds to step S918.

While the data processing device 101 displays the confirmation message in step S914 in this flowchart, the data processing device 101 may send the user's personal e-mail address(es) of the data processing device 101 that can be automatically searched to the image forming apparatus 104 without displaying the confirmation message.

According to the exemplary embodiments described above, even in a case where the user issues an instruction for the send-to-myself operation to the image forming apparatus 104 without setting an e-mail address as a destination on the data processing device 101, the user can set the user's personal e-mail address of the data processing device 101 as the destination without the effort of setting the e-mail address. While, in the present exemplary embodiment, the data processing device 101 is configured to search for the user's personal e-mail address of the data processing device 101 in a case where no destination is set at the time of sending a job, the configuration is not limited thereto. The data processing device 101 may be configured such that the searched user's personal e-mail address of the data processing device 101 is set by default in the e-mail address setting area 712.

The present disclosure includes the following processing. That is, software (program) to implement the functions of the exemplary embodiments described above is supplied to a system or a device via a network or a storage medium of various types, and the processing is executed by a computer (or a CPU, a microprocessing unit (MPU), or the like) of the system or device reading the program.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014214, filed Jan. 30, 2020, which is hereby incorporated by reference herein in its entirety.

What is claimed is:

1. A method for a system comprising devices that include an information processing device and an image forming apparatus, the method comprising:
   registering a transmission destination or a storage destination in association with user information by the image forming apparatus;
   storing the user information by the information processing device;
   sending job information, which is information for causing the image forming apparatus to send an image to a set transmission destination or to store the image into a set storage destination, and the stored user information to the image forming apparatus by the information processing device; and
   based on receiving the sent job information, executing the login processing by using the user information without receiving any operation on the image forming apparatus, and sending the image to the transmission destination registered in association with the sent user information or storing the image into the storage destination registered in association with the sent user information by the image forming apparatus.

2. The method according to claim 1, further comprising:
   acquiring connection information from the image forming apparatus via short-range wireless communication by the information processing device; and
   performing wireless local area network (LAN) communication with the image forming apparatus using the acquired connection information by the information processing device,
   wherein, in the sending, the job information is sent to the image forming apparatus using the LAN communication.

3. The method according to claim 2, wherein, after the acquiring of the connection information, processing until the sending of the job information is automatically performed.

4. The method according to claim 1, wherein the job information is set on the information processing device.

5. A method for a system comprising devices that include an information processing device and an image forming apparatus, the method comprising:
   registering authentication information at the information processing device;
   transmitting, based on a user operation, the registered authentication information and job information by the information processing device to the image forming apparatus, the job information being information for causing the image forming apparatus to execute an image forming function;
   receiving the transmitted authentication information and the transmitted job information at the image forming apparatus; and
   executing login processing by using the received authentication information and executing the image forming function based on the job information at the image forming apparatus,
   wherein, when the authentication information and the job information are transmitted based on the user operation, the login processing and the image forming function are executed without receiving any user operation at the image forming apparatus.

6. The method according to claim 5, wherein the user operation is an execution instruction received from a user at the information processing device.

7. The method according to claim 5, wherein the user operation is an operation of bringing the information processing device close to the image forming apparatus.

8. The method according to claim 5, further comprising:
   receiving a setting of the job information to be transmitted at the information processing device,
   wherein the job information is information for transmitting, by the image forming apparatus, an image scanned by the image forming apparatus.

9. The method according to claim 5, wherein, in a case of failure in the login processing executed using the received authentication information at the image forming apparatus, an error notification is made from the image forming apparatus to the information processing device.

10. The method according to claim 5, wherein the image forming function is processing using a setting value corresponding to the received authentication information.

11. The method according to claim 5, wherein a scan image obtained by executing scanning based on the job information is transmitted to a destination registered in the image forming apparatus in association with the received authentication information.

12. A method for an information processing device, the method comprising:
    registering authentication information; and
    transmitting, based on a user operation, the registered authentication information and job information to an image forming apparatus, the job information being information for causing the image forming apparatus to execute an image forming function,
    wherein, when the authentication information and the job information are transmitted based on the user operation, the login processing and the image forming function are executed at the image forming apparatus without receiving any user operation at the image forming apparatus.

13. The method according to claim 12, wherein the user operation is an execution instruction received from a user at the information processing device.

14. The method according to claim 12, wherein the user operation is an operation of bringing the information processing device close to the image forming apparatus.

15. The method according to claim 12, further comprising:
    receiving a setting of the job information to be transmitted at the information processing device.

16. The method according to claim 12, wherein the image forming function is processing using a setting value corresponding to the authentication information.

17. The method according to claim 12, wherein a scan image obtained by executing scanning based on the job information is transmitted to a destination registered in the image forming apparatus in association with the authentication information.

\* \* \* \* \*